United States Patent [19]

Maruyama et al.

[11] Patent Number: 4,485,444

[45] Date of Patent: Nov. 27, 1984

[54] RETARDER BRAKE AUTOMATIC CONTROL SYSTEM

[75] Inventors: Yasuhiro Maruyama, Hiratsuka; Takaichi Saigo, Isehara; Sakae Tanahashi, Hiratsuka; Yoshihei Masai, Zama, all of Japan

[73] Assignee: Kabushiki Kaisha Komatsu, Tokyo, Japan

[21] Appl. No.: 326,370

[22] Filed: Dec. 1, 1981

[30] Foreign Application Priority Data

| Dec. 4, 1980 [JP] | Japan | 55-171236 |
| Dec. 4, 1980 [JP] | Japan | 55-171237 |
| Dec. 4, 1980 [JP] | Japan | 55-171238 |
| Dec. 4, 1980 [JP] | Japan | 55-171239 |

[51] Int. Cl.³ ............................................. G06F 15/20
[52] U.S. Cl. ................................ 364/426; 364/424.1; 340/52 B
[58] Field of Search ............ 364/426, 434, 424.1; 340/57, 52 B; 303/100, 92; 188/79.5 B, 71.6; 324/161

[56] References Cited

U.S. PATENT DOCUMENTS

| 3,141,707 | 5/1963 | Nigh | 303/100 |
| 3,582,926 | 6/1971 | Hassan | 340/52 B |
| 3,674,114 | 7/1972 | Howard | 340/57 |
| 3,803,425 | 4/1974 | Carp | 324/161 |
| 3,838,891 | 10/1974 | Hamelin | 303/92 |
| 3,964,018 | 6/1976 | Strait et al. | 340/52 F |
| 4,181,943 | 1/1980 | Mercer, Sr. et al. | 364/426 |
| 4,314,237 | 2/1982 | Darrow | 364/426 |
| 4,335,428 | 6/1982 | Miki et al. | 364/424.1 |

Primary Examiner—Felix D. Gruber
Assistant Examiner—Thomas Black
Attorney, Agent, or Firm—Holman & Stern

[57] ABSTRACT

A retarder brake automatic control system capable of causing a vehicle to run downhill at a speed set by a speed setter, in which a vehicle speed is automatically controlled by means of a microcomputer. The microcomputer includes a fault detector which detects abnormality in factors for safety running of the vehicle, and controls a retarder brake so as to cause the vehicle to run at an appropriate speed in accordance with the output of the fault detector.

11 Claims, 13 Drawing Figures

BRAKE COOLING OIL TEMPERATURE

| LOW | $T_1$ | $T_2$ | $T_3$ | HIGH |
|---|---|---|---|---|
| SAFETY RANGE | WARNING RANGE A1 | WARNING RANGE A2 | ALARMING RANGE | |

RETARDER BRAKE AUTOMATIC CONTROL SYSTEM

BACKGROUND OF THE INVENTION

This invention relates to a retarder brake automatic control system for dump trucks.

Speed control of dump trucks for use, for example, in ore transportation at mines is performed by manual operation of the retarder control lever by the operator during the descent of sloped roads. Effectiveness of the retarder brake largely depends on change in the road slope, weight of the load, and other factors, and the retarder brake control is performed according to the operator's judgment in each case. Accordingly, performing optimum control according to the road and load conditions is difficult, and there is a possibility of the brake disc being broken due to overheat when the descending distance is long.

In order to overcome these problems, it is known to detect the cooling oil temperature of the brake and to make the operator aware of the danger typically by alarming whenever the oil temperature has exceeded the alarming range. The operator stops the vehicle according to this alarm, and waits until the oil temperature falls to a safety level.

However, since the conventional alarm devices do not prevent brake seizure due to the heat generated and corrective action is taken only after oil temperature build-up, there is a possibility of damaging the brake. Moreover, when the operator continues to run the vehicle neglecting the alarm, the alarm unit can produce no effect. As a result, the brake is unduly used and an accident might occur. In addition, stopping the vehicle each time the oil temperature rises lowers work efficiency. Furthermore, since the operator should operate the retarder control lever together with the steering wheel, there is a problem in terms of safety and operatability.

SUMMARY OF THE INVENTION

Accordingly, it is a primary object of the present invention to provide an optimum retarder brake automatic control system characterized by high safety and maintaining the work efficiency at a current level.

Another object of the present invention is to provide such a retarder brake automatic control system which causes the vehicle to run at a set speed by controlling the rear wheel braking force according to the speed of the speed set lever and performs optimum speed control according to the brake cooling oil temperature through the detection of the oil temperature so as to prevent oil temperature rise.

A further object of the present invention is to provide a retarder brake automatic control system which can detect any trouble of a temperature sensor accurately and with ease by employing a temperature element, typically a thermistor, which detect temperature continuously and at a high accuracy and an inexpensive temperature element featured by a simple construction and high reliability, typically a bimetal switch.

A still further object of the present invention is to provide a retarder brake automatic control system which can prevent vehicle accident very effectively by detecting any speed sensor trouble at each speed range of the automatic transmission.

A further object of the present invention is to provide a retarder brake automatic control system which achieves a smooth speed reduction without the application of an abrupt large braking force by changing the degree of amplification of difference between the set speed and virtual speed according to that difference by means of a speed control circuit even when the set speed is abruptly changed.

A further object of the present invention is to provide a retarder brake automatic control system which can minimize brake damage and enhance durability through the speed control so as not to allow brake cooling oil temperature to rise.

A still further object of the present invention is to provide a retarder brake automatic control system which has such excellent effect as promoting work efficiency resulted from nearly complete elimination of waiting until the oil temperature falls while stopping the vehicle, since it allows the vehicle to run without stopping by automatically selecting the optimum temporary set speed according to the load even when the set speed is improper.

DETAILED DESCRIPTION OF THE INVENTION

Figure 1:
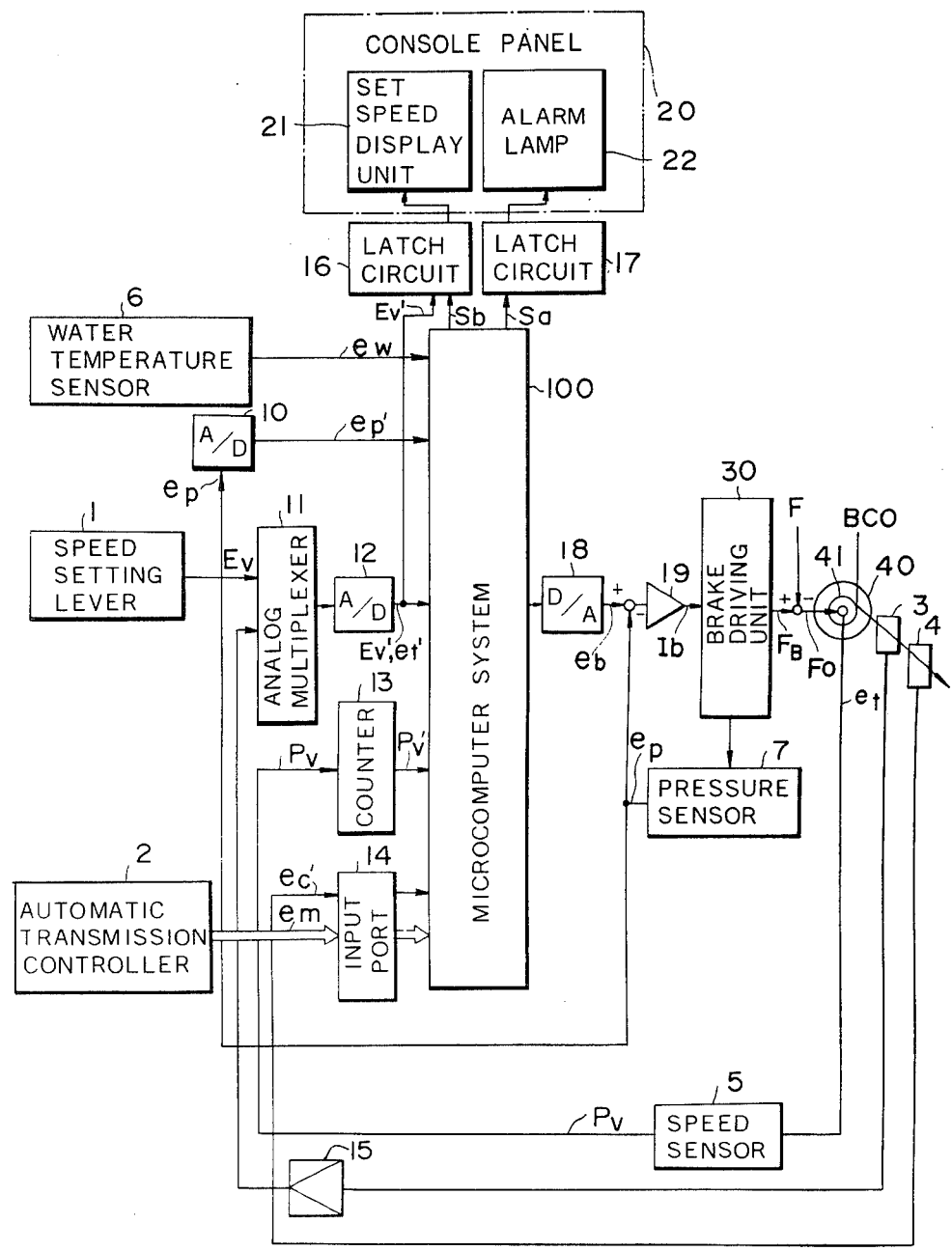
FIG. 1 is a block diagram of the retarder brake automatic control system of the present invention.

Referring to FIG. 1, the retarder brake automatic control system has the fault (trouble) monitoring function, speed control function, and brake cooling oil temperature control function.

The fault monitoring function detects abnormality of various sensors of the retarder brake automatic control system including a temperature sensor 3 for detecting brake cooling oil temperatures (hereinafter referred to as oil temperatures), a speed sensor 5, a water temperature sensor 6 for detecting water temperatures of the radiator, and a pressure sensor 7 for detecting pneumatic pressure for driving the brake, displays the fault content on a set speed display unit 21, and takes control actions as shown in Table 1.

TABLE 1

| Faulty Mode | Display (flashing) | Faulty Content | Control System's Action | Operator's Action |
|---|---|---|---|---|
| | Indefinite | Computer trouble (running uncontrolled) | Oil temperature alarm lamp lights (buzzer sounds). | Stop vehicle, turn off engine switch and check. |
| 0 | E0 | E/G overrun | Raise retarder brake force to maximum. | Reduce speed by using foot brake together. |
| 1 | E1 | Brake oil temperature at alarming level | Gradually slow down vehicle speed and finally stop it. | Reduce speed by using foot brake together. |
| 2 | Set speed | Brake oil temperature at alarming level | Gradually slow down vehicle speed and control it. | |
| 3 | E3 | Speed pulse in abnormality | Gradually increase brake force and stop vehicle. (No speed control is made) | |
| 4 | E4 | Wire broken in oil temperature sensor | Gradually slow down and stop vehicle. | |
| 5 | E5 | Oil temperature sensor fault | Same as above | |
| 6 | E6 | A/D converter fault (Oil temperature and set speed are not picked up) | Same as above | |
| 7 | E7 | Transmission stage data error (Data from transmission controller is abnormal | Same as above | |

The speed control function picks up the set value Ev of a speed setting lever 1 and virtual speed signal Pv from the speed sensor 5 into a microcomputer system 100 through an analog multiplexer 11 and an analog-to-digital converter (hereinafter referred to as AD converter) as signals Ev' and Pv' respectively, displays the set speed on a set speed display unit 21 of a console panel 20, and outputs the rear wheel brake force according to the difference between the set speed and virtual speed, thereby controlling the descending vehicle speed to a constant value.

The brake cooling oil temperature control function picks up temperature signal et from the temperature sensor 3 provided at the brake outlet of brake cooling oil BCO and transmission stage signal em from an automatic transmission controller 2 into the microcomputer system 100. Then, this function performs speed control according to the temperature signal et in three modes: the oil temperature safety range, oil temperature warning range, and oil temperature alarming range. In the mode of oil temperature safety range, normal speed control is performed with the value set by the speed setting lever 1 taken as the set speed. In the mode of oil temperature warning range, the speed control is performed according to a temporary set value which is lower than the set speed as found by the computer so as to prevent further oil temperature rise. In this mode, an oil temperature alarm lamp 22 on the console panel 20 is lit, and the vehicle is slowed down to stop. Transmission stage signal em from the automatic transmission controller 2 is used for the detection of temporary set speed in the oil temperature warning range.

Figure 2:
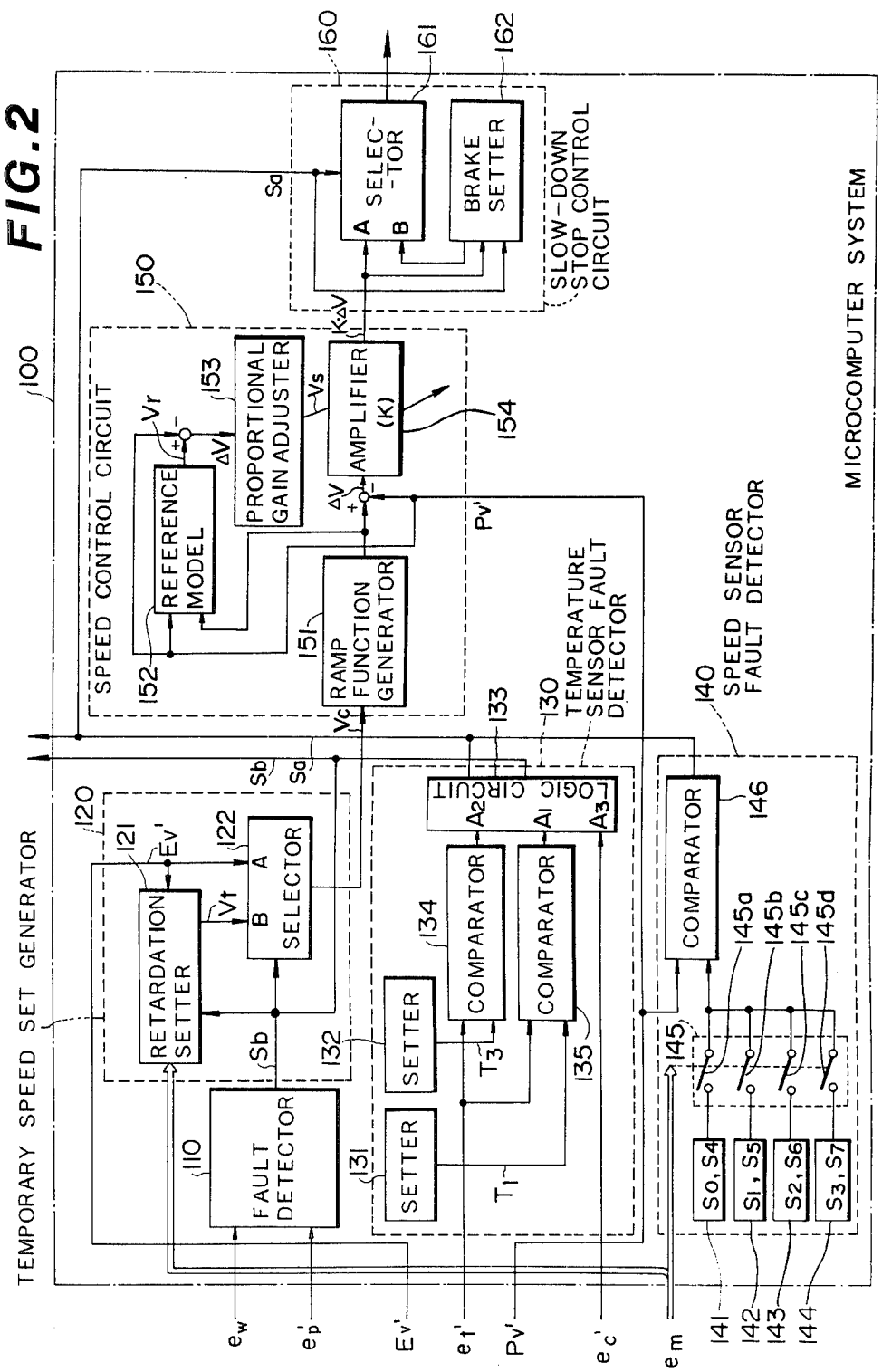
FIG. 2 is a block diagram of an embodiment of the microcomputer system according to the present invention.
Figure 3:
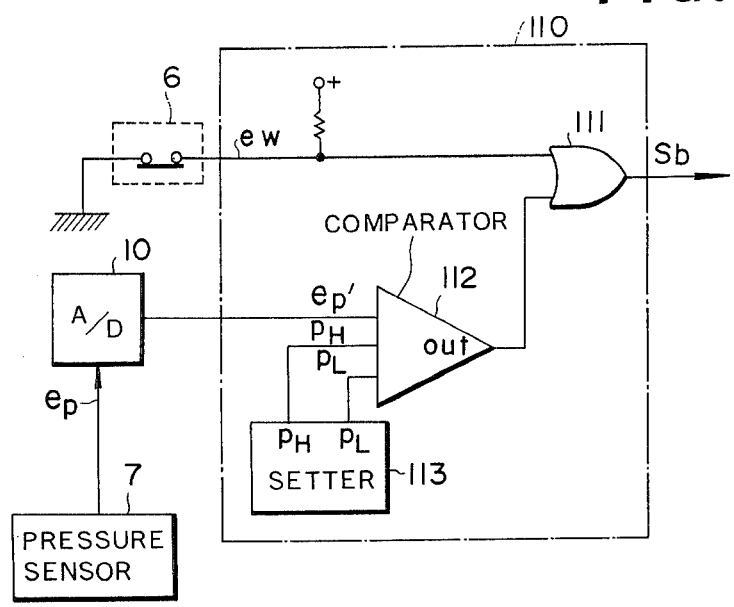
FIG. 3 is a circuit diagram of the fault detector.

First, the fault detection function will be described. Referring to FIG. 2, a fault detector 110 is for detecting the abnormality of the water temperature sensor 6 and the pressure sensor 7, and receives signal ew from the water temperature sensor 6 and signal ep from the pressure sensor 7 converted to digital signal ep' at the AD converter 10. The fault detector 110 is configured as shown in FIG. 3. The water temperature sensor 6 is for detecting abnormality of water temperature of the radiator, and becomes off when the water temperature has exceeded preset value. Accordingly, signal ew becomes a signal at high level (hereinafter referred to as H level) when the water sensor 6 becomes off. The fault detector 110 outputs this signal as Sb via an OR circuit 111.

The pressure sensor 7 outputs analog signal ep corresponding to the pneumatic pressure for driving the brake to the AD converter 10. The AD converter 10 converts this signal ep to a digital signal ep', and outputs it to a comparator 112 of the fault detector 110. The comparator 112 is a window comparator, and to other inputs of the comparator 112 are fed signals PH and PL indicating the upper and the lower limits of pressure from a setter 113. When signal ep' is out of the range from signal PH to signal PL, an H level signal is output. This signal is output as signal Sb via the OR circuit 111.

Figure 5:
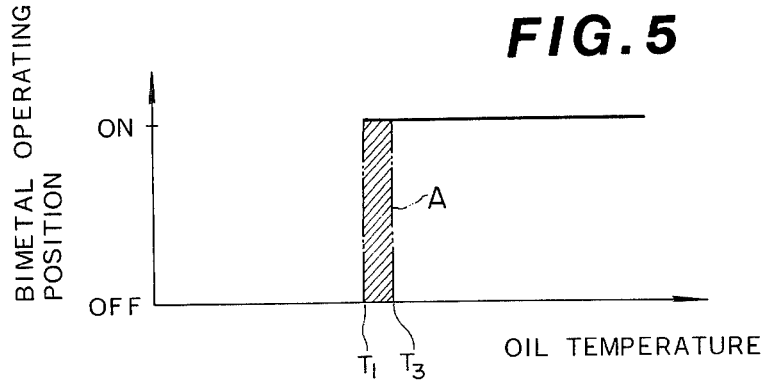
FIG. 5 is a graph showing an example of operating characteristics of the bimetal switch.

The signal Sb is fed to the set speed display unit 21 of the console panel 20 via a latch circuit 16 (FIG. 1). Upon reception of signal Sb, the set speed display unit 21 displays any sensor fault. Signal Sb is also fed to a retardation setter 121 of a temporary set speed generator 120 and a selector 122. The selector 122 normally outputs received set speed signal Ev' to input A, but when signal Sb is fed, the selector 122 outputs temporary set speed signal Va fed from the retardation setter 121 to input B. The temporary set speed generator 120 will be described later in detail in conjunction with the description of the brake cooling oil temperature control function A temperature sensor fault detector 130 detects any fault of the temperature sensors 3 and 4, which are for detecting the brake cooling oil temperatures through the comparison between them, and also detects if the brake cooling oil temperature is in the safety range, the warning range, or the alarming range through the comparison between setters 131 and 132 and the temperature sensors. The temperature sensor 3 is a temperature element, typically a thermistor sensor, detects the temperature at the brake outlet of the brake cooling oil, and outputs temperature signal et corresponding thereto. This temperature signal et is fed to the AD converter 12 via an amplifier 15 and the analog multiplexer 11, converted to a digital signal et', and output to the temperature sensor fault detector 140. The output characteristics of the thermistor sensor 3 are typically represented as shown in FIG. 3. The temperature sensor 4 is a temperature element, typically a bimetal switch, which turns ON and OFF according to a given temperature, is provided at the brake outlet of the brake cooling oil similar to the temperature sensor 3, and ONs/OFFs according to the brake cooling oil temperature. The operating characteristics of this bimetal switch 4 are typically as shown in FIG. 5: the sensor 4 becomes OFF when the temperature is below $T_1$, becomes ON when the temperature is $T_3$ or more, and becomes the indefinite range A due to the element variation when the temperature is between $T_1$ and $T_3$. In this indefinite range A, whether the sensor 4 becomes ON or OFF is undetermined.

Figure 4:
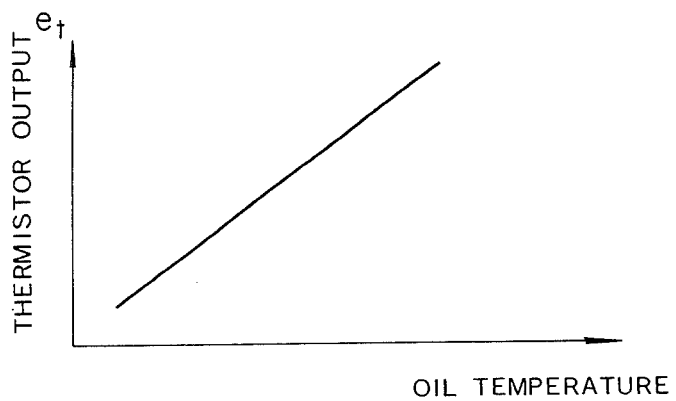
FIG. 4 is a graph showing an example of output characteristics of the thermistor sensor.

Accordingly, normality or abnormality of the sensor 4 is judged according to the conditions as shown in Table 2 based on the typical characteristices shown in FIGS. 4 and 5. That is, the output range of the thermistor sensor 3 is divided into three temperature ranges: below $T_1$, between $T_1$ and $T_3$, and above $T_3$. Normality/abnormality of the bimetal switch 4 is judged by observing ON/OFF state.

TABLE 2

| Condition | On thermister sensor side | On bimetal side | Decision |
| --- | --- | --- | --- |
| 1 | Below $T_1$ | OFF | Normal |
| 2 | Below $T_1$ | ON | Abnormal |
| 3 | $T_1$ to $T_3$ | OFF | Normal |
| 4 | $T_1$ to $T_3$ | ON | Normal |
| 5 | Over $T_3$ | OFF | Abnormal |
| 6 | Over $T_3$ | ON | Normal |

The temperature signal et' corresponding to the output of the thermistor sensor 3 is fed to comparators 134 and 135 of the temperature sensor fault detector 130. The setters 131 and 132 are for setting the above temperature ranges, and output set temperature signals $T_1'$ and $T_3'$ corresponding to set temperatures $T_1$ and $T_3$. The comparator 134 compares signal et' with $T_3'$, outputs a low level (hereinafter referred to as L level) signal when et'<$T_3'$, and outputs a high level (hereinafter referred to as H level) signal when et'>$T_3'$. The comparator 135 compares et' with $T_1$, outputs an L level signal when et'<$T_1'$, and an H level when et'>$T_1'$. The output ec' of the bimetal switch 4 is the H level while in operation, and the L level while in nonoperation. The outputs of the comparators 134 and 135 and bimetal switch 4 are fed to input terminals $A_1$ through $A_3$ of a logic circuit 133.

The logic circuit 133 judges as shown in Table 2 according to said signals fed to the input terminals $A_1$ through $A_3$, and outputs fault signal Sb. The signal Sb at the H level indicates normality, and that at the L level abnormality. (Refer to Table 3).

TABLE 3

| | Condition | | | | | |
| --- | --- | --- | --- | --- | --- | --- |
| | 1 | 2 | 3 | 4 | 5 | 6 |
| Input | | | | | | |
| $A_1$ | L | L | H | H | H | H |
| $A_2$ | L | L | L | L | H | H |
| $A_3$ | L | H | L | H | L | H |
| Output: | | | | | | |
| Sb | H | L | H | H | L | H |

Abnormality of the temperature sensor 3 or 4 is thus judged, and a fault signal is output. This fault signal Sb is fed to the set speed display unit 21 of the console panel 20 and the temporary set speed generator 120. Upon the reception of the signal Sb, the set speed display unit 21 notifies the operator of the temperature sensor trouble, and the temporary set speed generator 120 generates a temporary set speed signal so as to stop the vehicle.

The logic circuit 133 applies the signal Sb to the set speed display unit 21 of the console panel and the temporary set speed generator 120 via the latch circuit 16 when the temperature signal et' is within the warning range ($T_1'$<et'<$T_3'$). The circuit 133 applies a signal Sa to an alarm lamp 22 of the console panel 20 and slowdown stop control circuit 160 via a latch circuit 17 when the temperature signal et' is within the alarming range (et'>$T_3'$). Operations of the temporary set speed generator 120 and slowdown stop control circuit 160 will be described later in detail in conjunction with the explanation of the brake cooling oil temperature control function.

The fault detection according to the conditions as shown in Table 2 may be performed by an ordinary logic circuit or a general purpose processor such as a microcomputer.

Though, in this embodiment, a thermistor sensor is used as a continuously measurable temperature element, other elements such as a thermocouple may be used as well.

A speed sensor fault detector 140 is for detecting faults of the speed sensor 5. The speed sensor 5 is for detecting virtual vehicle speed, and generates pulse signal Pv of a frequency corresponding to the speed of revolution of a wheel 40. A counter 13 counts the input pulse signal Pv at given intervals, and applies the count value to a comparator 146 of the speed sensor fault detector 140 as a speed signal Pv'.

Figure 6:
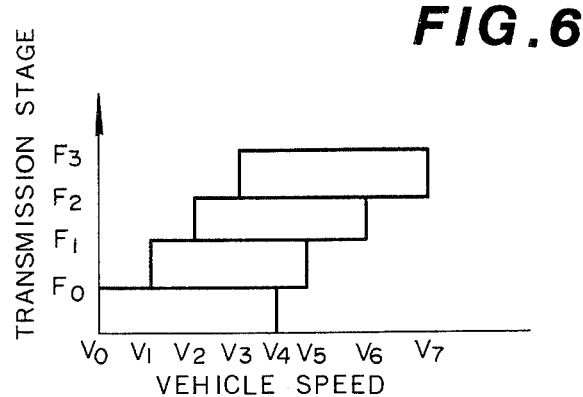
FIG. 6 is a graph showing the relationship between the transmission gear stages of the automatic transmission control system and the speed ranges.

The automatic transmission controller 2 has a transmission stage control circuit (not shown) which receives vehicle speed signal or engine speed signal and outputs a given transmission stage signal. The transmission stage is automatically changed based on this transmission stage so as to permit determination of the vehicle speed in each transmission stage. The transmission stage of this automatic transmission controller 2 is typically four steps from $F_0$ to $F_3$, and the vehicle speed range in each step is as shown in FIG. 6.

Memories 141 through 144 of the speed sensor fault detector 140 are for setting the upper and the lower limits of speeds in transmission steps $F_0$–$F_3$. The memory 141 stores set values $S_0$ and $S_4$ corresponding to the lower limit speed $V_4$ and the upper limit value $V_4$ (FIG. 6) in the transmission step $F_0$, and outputs the above $S_0$ and $S_4$. Similarly, the memories 142, 143 and 144 store the lower limit set values $S_1$, $S_2$ and $S_3$ corresponding to the lower limit speeds $V_1$, $V_2$ and $V_3$ in the transmission steps $F_1$, $F_2$ and $F_3$, and the upper limit set values $S_1$, $S_2$ and $S_3$ corresponding to the upper limit speeds $V_5$, $V_6$ and $V_7$ in the transmission steps $F_1$, $F_2$ and $F_3$, and output these set values. A transfer circuit 145 is typically a switching circuit. Switches 145a through 145d are controlled by the transmission stage signal em applied from the automatic transmission controller 2. The switch 145a becomes ON only when the transmission step is $F_0$, and becomes OFF when otherwise. Similarly, the switches 145b, 145c and 145d become ON only in transmission steps $F_1$, $F_2$ and $F_3$, respectively. The lower and upper limit set values $S_0$, $S_4$; $S_1$, $S_5$; $S_2$, $S_6$; $S_3$, $S_7$ of the memories 141, 142, 143 and 144 are fed to a comparator 146 through the switches 145a, 145b, 145c and 145d as the comparator 146 inputs respectively.

The comparator 146 is typically a window comparator, and compares the lower limit values and the upper limit values to be fed to the memories 141 through 144 with the speed signal Pv' corresponding to the output of the speed sensor 5. If (lower limit value)$<$Pv'$<$(upper limit value), said comparator 146 outputs H level signal, and outputs L level signal when Pv'$>$(lower limit value) and Pv'$>$(upper limit value). The outputs of the comparator 146 in transmission steps $F_0$ through $F_3$ are as shown in Table 4.

TABLE 4

| Speed signal | | Pv' | Pv' |
|---|---|---|---|
| Set value | | $S_0$ to $S_7$ | $S_0$ to $S_7$ |
| Trans- | $F_0$ | $S_0 < Pv' < S_4$ | Pv'$<S_0$ or Pv'$>S_4$ |
| mission | $F_1$ | $S_1 < Pv' < S_5$ | Pv'$<S_1$ or Pv'$>S_5$ |
| stage | $F_2$ | $S_2 < Pv' < S_6$ | Pv'$<S_2$ or Pv'$>S_6$ |
| | $F_3$ | $S_3 < Pv' < S_7$ | Pv'$<S_3$ or Pv'$>S_7$ |
| Comparator output | | H | L |

When the output of the comparator 146 is H level, the speed sensor 5 is judged normal, while when the comparator output is L level, the sensor 5 is judged abnormal.

Assume that a dump truck is running in transmission step $F_1$. In the transmission step $F_1$, only the switch 142 is ON, and the lower limit set value $S_1$ and upper limit set value $S_5$ are fed to the comparator 146 through the switch 145b. The comparator 146 compares these set values $S_1$ and $S_5$ with the speed signal Pv', outputs an H level signal when $S_1 < Pv' < S_5$, and outputs L level signal Sa when $S_1 >$ Pv' or Pv'$> S_5$. The output signal Sa of the comparator 146 is fed to the alarm lamp 22 of the console panel 20 and the slow-down stop control circuit 160 via the latch circuit 17. As a result, the alarm lamp 22 lights, notifying the operator of the abnormality. The slow-down stop control circuit 160 gradually increases the braking force, causing the vehicle to stop.

In this embodiment, the lower and the upper limit values of the speed in the transmission steps are stored in the memories, but ordinary setters may be used in lieu of memories.

A general purpose processor such as microcomputer may be used in lieu of the speed sensor fault detector 140, or a logic circuit may be used for the purpose.

The speed control function will now be described. Referring to FIG. 2, a speed control circuit 150 out put rear wheel braking force according to the difference between the set speed and virtual speed for keeping the descending speed constant. Particularly, for the above difference, the gain is controlled so as to assure a smooth speed change.

Figure 7A:
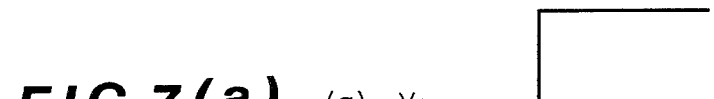
FIGS. 7(a) and 7(b) are waveform diagrams showing an example of input/output signal waveform of the ramp function generator, respectively.
Figure 7B:
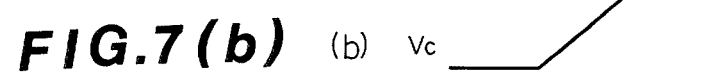
Figure 8:
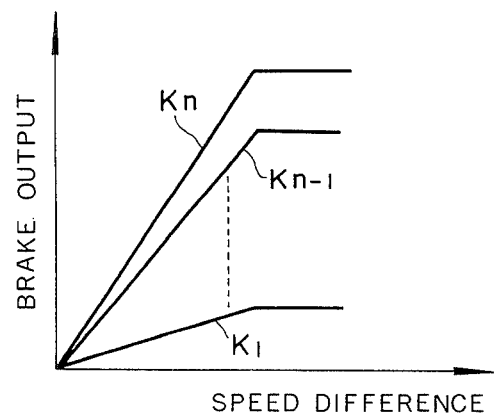
FIG. 8 is a graph showing an example of change in the degree of amplification of the amplifier.

This speed control is basically performing proportional action. The speed is kept constant through the output of a brake signal proportional to the difference $\Delta v$ between the set speed signal or temporary set speed signal (hereinafter referred to as set speed signal Vc) outputted from the temporary set speed generator 120 and virtual speed signal Pv'. In the normal proportional control, when the set speed signal Vc has abruptly changed (FIG. 7(a)), a large brake signal is unexpectedly output giving an unpleasant shock to the operator. Accordingly, a ramp function generator 151 keeps the rate of change of the set speed signal Vc below a fixed value, typically below 0.2G (FIG. 7(b)) prior to output. A reference model 152 is structured as a formula model, and outputs ideal speed signal Vr that indicates ideal speed change based on the difference between a certain set speed signal Vc and virtual speed signal Pv' which are fed, and the set speed signal Vc. This ideal speed signal Vr is successively calculated by a predetermined calculation formula based on data regarding standard load and weight. A proportional gain adjuster 153 outputs signal Vs corresponding to the difference $\Delta V$ between the ideal speed signal Vr and virtual speed signal Pv' and feeds the signal Vs to an amplifier 154, thereby controlling gain K of this amplifier 154 (FIG. 8). The amplifier 154 amplifies the difference $\Delta v$ between the set speed signal Vc and the virtual speed signal Pv' based on the gain determined by signal Vs, and outputs a retarder brake control signal K·$\Delta v$.

Gain K is, for example, controlled as follows.

(i) Kmin $\leq$ K $\leq$ Kmax

The variable range of K is predetermined.

(ii) Where $\Delta V > 0$ and $\Delta v < 0$

Decrease K.

This represents the case where the ideal speed signal Vr is larger than the virtual speed signal Pv', and the set speed signal Vc is smaller than the virtual speed signal Pv', and the case of over-application of braking force. Accordingly, gain K is decreased, and the brake control signal is reduced.

(iii) Where $\Delta V < 0$ and $\Delta v < 0$

Increase K.

This represents the case where the both the ideal speed signal Vr and the set speed signal Vc are lower than the virtual speed signal Pv', and the case of under-application of braking force. Accordingly, gain K is increased for increasing the brake control siganl.

(iV) where $\Delta v > 0$

Set to K=0.

This is the case where the virtual speed signal Pv' is lower than the set speed signal Vc. In such case, gain is set to 0, and the brake control signal is brought to 0. This is for performing speed control via the brake control.

A speed set signal Ev' corresponding to the position of the speed setting lever 1 (FIG. 1) is fed to the latch circuit 16. The latch circuit 16 latches this speed set signal Ev', applies the latch output Ev' to the set speed display unit 21 of the console panel 20 for displaying the set vehicle speed.

The brake cooling oil control function will be described subsequently.

This control is based on the fact that the flow-rate of brake cooling oil is proportional to the engine speed. When the brake cooling oil temperature has increased, the automatic transmission controller 2 is shifted down by the application of braking force so as to increase the engine speed and the flowrate of brake cooling oil BCO, thereby preventing the temperature rise of BCO and heat generation in a brake 41 due to slow-down, and performing speed control so as to obtain engine braking effect through the shift-down.

The operation will now be described with reference to the flowchart of FIG. 9.

The temperature sensor 3 detects the oil temperature T at the brake outlet of brake cooling oil BCO (FIG. 1), and outputs corresponding temperature signal et. This temperature signal et is fed to the microcomputer system 100 through the amplifier 15, the analog multiplexer 11, and the AD converter 12. The transmission stage signal em outputted from the automatic transmission controller 2 is fed to the microcomputer system 100 via an input port 14.

Figure 9:
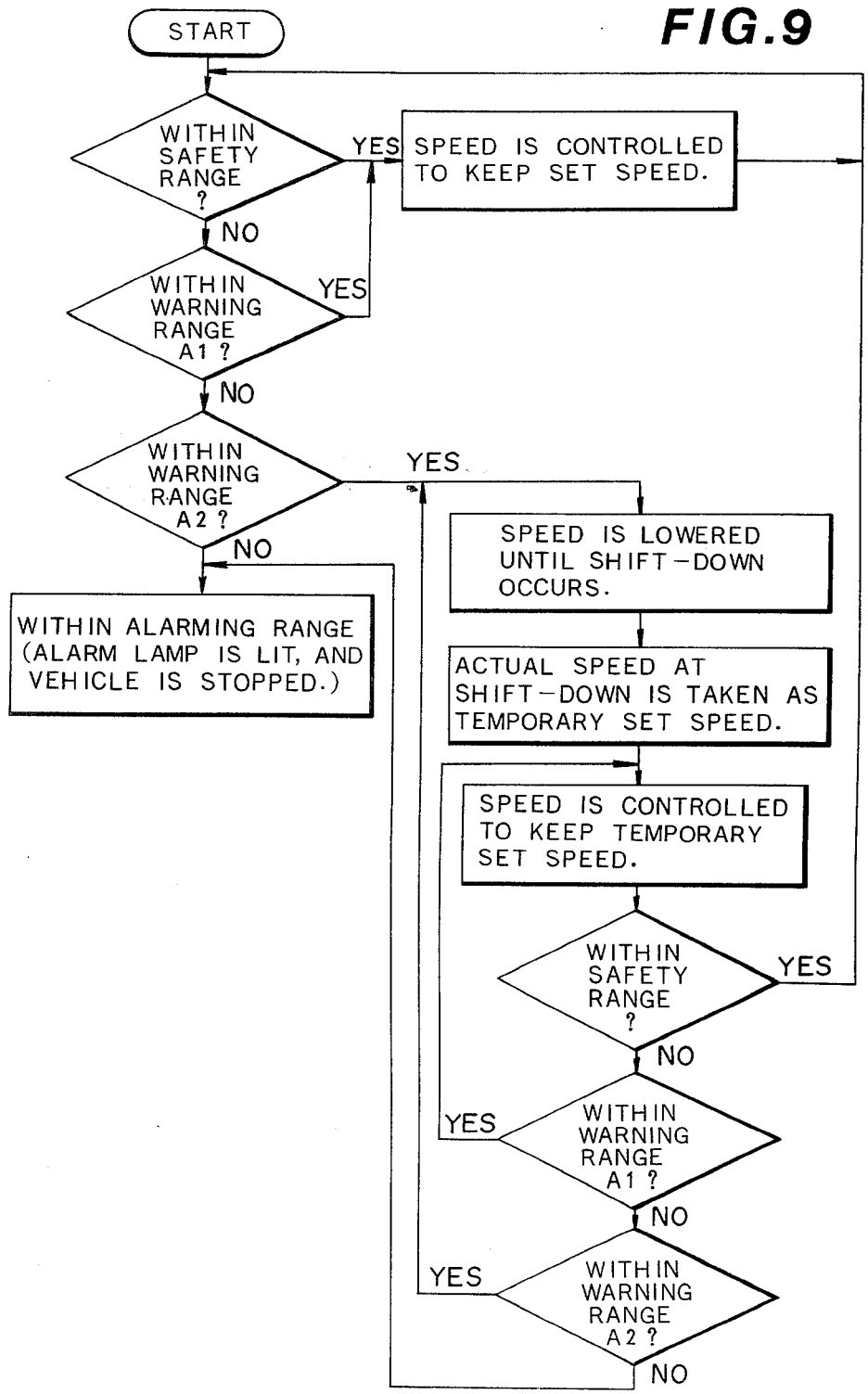
FIG. 9 is a flowchart illustrating the oil temperature control function of the present invention.

The microcomputer system 100 performs speed control according to the value of the temperature signal et' thus obtained typically in three modes: the oil temperature safety range ($T<T_1$), the oil temperature warning range ($T_1<T<T_3$), and the temperature alarming range ($T>T_3$) (FIG. 9).

In the mode of oil temperature safety range ($T<T_1$), vehicle speed is controlled by the retarder brake control so as to become the set speed as set by the speed setting lever 1.

Figure 10:
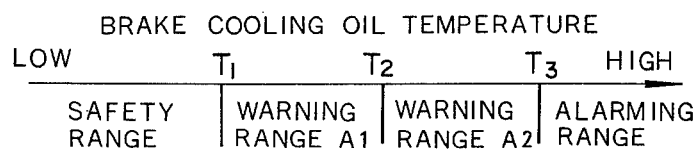
FIG. 10 is an explanatory diagram showing an example of a classification in the oil temperature control function of the present invention.

The oil temperature warning range A is further divided to oil temperature warning ranges $A_1$ and $A_2$ (FIG. 10). When the oil temperature T is within the oil temperature warning range $A_1$ ($T_1<T<T_2$), the speed control similar to that in the oil temperature safety mode is performed. As the duration of retarder brake control is extended, the oil temperature T of brake cooling oil BOC increases accordingly. As the oil temperature T rises to the oil temperature warning range $A_2$ ($T_2<T<T_3$) beyond the range $A_1$, the braking force is increased by increasing brake control current Ib, and the vehicle is slowed down until the automatic transmission controller 2 makes shift-down. The automatic transmission controller 2 can effect shift-down easily by reducing the vehicle speed applying brakes. As the automatic transmission controller 2 completes shift-down, and the microcomputer system 100 picks up the transmission stage signal em at that time, the speed control is performed according to the temporary set speed signal which is the virtual speed signal Pv' at the time of the above shift-down.

For example, when the vehicle runs at the set speed of 30 km/h with the automatic transmission controller 2 in the 6th speed, and the vehicle can run even in 5th speed without the engine speed exceeding the upper limit value, shift-down to the 5th speed is effected, and the vehicle run at a higher engine speed.

As the engine speed increases, the flowrate of brake cooling oil BOC increases accordingly. As a result, the temperature T of BOC falls, and temperatures of a disc brake 41 and the brake operating fluid fall. When the oil temperature T falls to the level of oil temperature safety range ($T<T_1$) while a vehicle is running at this temporary set speed, the speed control in the mode of the above-mentioned oil temperature safety range, i.e., the speed control so as to gain the set speed by the speed setting lever 1 through the normal retarder brake control, is performed. When the oil temperature T exceeds the oil temperature safety range but is within the oil temperature warning range $A_1$ ($T_1<T<T_2$), the vehicle is run at the temporary set speed until the oil temperature T falls to the level of oil temperature safety range. When the oil temperature T does not fall in spite of the vehicle running at the temporary set speed, and continues to be in the oil temperature warning range $A_2$ ($T_2<T<T_3$), a braking force is applied to slow down the vehicle, shift-down is effected, and the virtual speed after this shift-down is taken as a new temporary set speed.

Speed control is performed at this new temporary set speed to lower the oil temperature of brake cooling oil BOC. On the other hand, engine brake effect is enhanced through shift-down.

When, in spite of the shift-down and speed control, oil temperature T rises to the level of oil temperature alarming range ($T>T_3$) beyond the oil warning range $A_2$, the vehicle is gradually slowed down to stop based on the output of the microcomputer system 100, an alarm signal Sa is output to light the alarm lamp 22 of the console panel 20 so as to draw the operator's attention.

When, for some reason, oil temperature T abruptly rises to the level of the oil temperature alarming range ($T>T_3$) beyond the oil temperature warning range $A_2$ when the vehicle is running within the oil temperature safety range, the vehicle is slowed down to stop without the speed control by temporary set speed, and the alarm lamp 22 is lit.

The above operation will now be described with reference to FIG. 2.

The temperature sensor fault detector 130 of the microcomputer system 100 detects abnormality of the temperature sensor of the fault monitoring function, and also detects the temperature ranges of oil temperature T, i.e., the oil temperature safety range ($T<T_1$), the oil temperature warning range ($T_1<T<T_3$), and the oil temperature alarming range ($T>T_3$), based on the received temperature signal et'. The oil temperature warning range is detected in two categories: the oil temperature warning ranges $A_1$ and $A_2$ (FIG. 10). The setter for setting the boundary temperature $T_2$ between the oil temperature warning ranges $A_1$ and $A_2$ is not shown in FIG. 2.

The output signal of this temperature sensor fault detector 130 is output to the temporary set speed generator 120 and the slow-down stop control circuit 160.

The temporary set speed generator 120 receives the set speed signal Ev' set by the speed setting lever 1, and the transmission stage signal em outputted from the automatic transmission controller 2. The selector 122 selects the set speed signal Ev' fed to the input A normally, and applies the above signal to the speed control circuit 150 as signal Vc. Now, when signal Sb is output as abnormality of the water temperature sensor 6 and that of the pressure sensor 7 is found by the fault detector 110, when abnormality of the temperature itself is detected, by the temperature sensor fault detector 130, or when signal Sb is output upon the detection of oil temperature T being in the warning range, the temporary set speed generator 120 becomes the temporary set speed generating mode.

Figure 11:
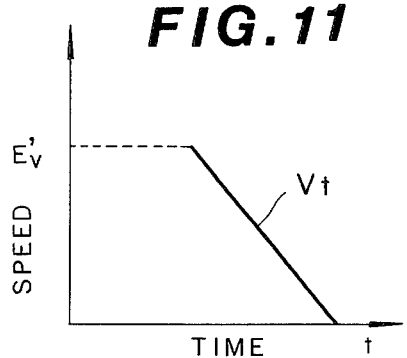
FIG. 11 is a graph showing an example of the output signal of the retardation setter.

That is, when signal Sb is fed, the retardation setter 121 decreases the set speed signal Ev' with time taking the input set speed signal Ev' as the initial value, and outputs a retardation signal Vt corresponding to retardation $-0.2G$ (G: gravitational acceleration) (FIG. 11). The selector 122 selects and outputs the retardation signal Vt fed to the input B according to signal Sb.

In the above operation, when the vehicle speed is retarded, shift-down of the automatic transmission controller 2 is effected, and a transmission stage signal em indicating shift-down is output to the retardation setter 121. Upon the reception of the signal em, the retarder setter 121 stops decreasing retardation signal Vt, and outputs the retardation signal Vt at that time as a temporary speed signal Vt, thereby oil temperature of brake cooling oil BOC being lowered.

When the oil temperature falls to the level of safety range, and the water sensor 6 and pressure sensor 7 return to normal, the selector 122 is switched to input A, and the set speed signal Ev' set by the speed setting lever 1 is re-output from the temporary set speed generator 120.

For generating a temporary set speed of a fixed speed, the temporary set speed generator 120 gradually reduces the set speed signal Ev' taking it as the initial value, and takes the retardation signal Vt at the time when the transmission stage signal em is input as the temporary set speed signal. Alternatively, however, it may be arranged so that a plurality of different temporary set speed values are memorized in advance, and proper temporary set speed signal is output according to set speed signal Ev' and signal Sb.

The slow-down stop control circuit 160 becomes ready to operate on signal Sa generated when the fact that the oil temperature reached the alarming range is detected by the temperature sensor fault detector 130, or when abnormality of the speed sensor 5 is detected by the speed sensor fault detector 140.

Figure 12:
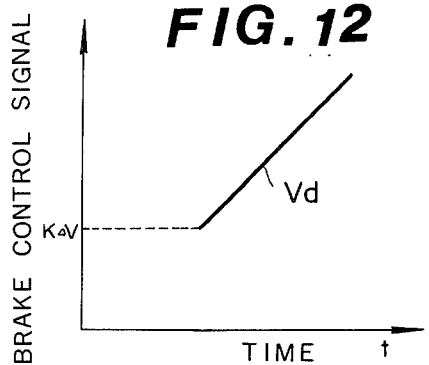
FIG. 12 is a graph showing an example of the output signal of the braking force setter.

When signal Sa is fed, the slow-down stop control circuit 160 gradually increases the retarder brake control signal K·$\Delta$v outputted from the speed control circuit 150 at that time taking it as the initial value, and causes the vehicle to stop. A brake setter 162, upon the reception of signal Sa, outputs retardation signal Vd (FIG. 12) of a given rate of increase to the input B of a selector 161 taking the retarder brake control signal K·$\Delta$v as the initial value. The selector 161 selects and outputs retarder brake control signal K·$\Delta$v fed to the input A normally, and selects and outputs retardation signal Vd fed to the input B when Sa is applied.

That is, when the oil temperature rises to the alarming range, or when the speed sensor 5, which is critical for the speed control, is in trouble, the vehicle is stopped by the operation of the above slow-down stop control circuit 160, thereby preventing serious accidents.

Figure 13:
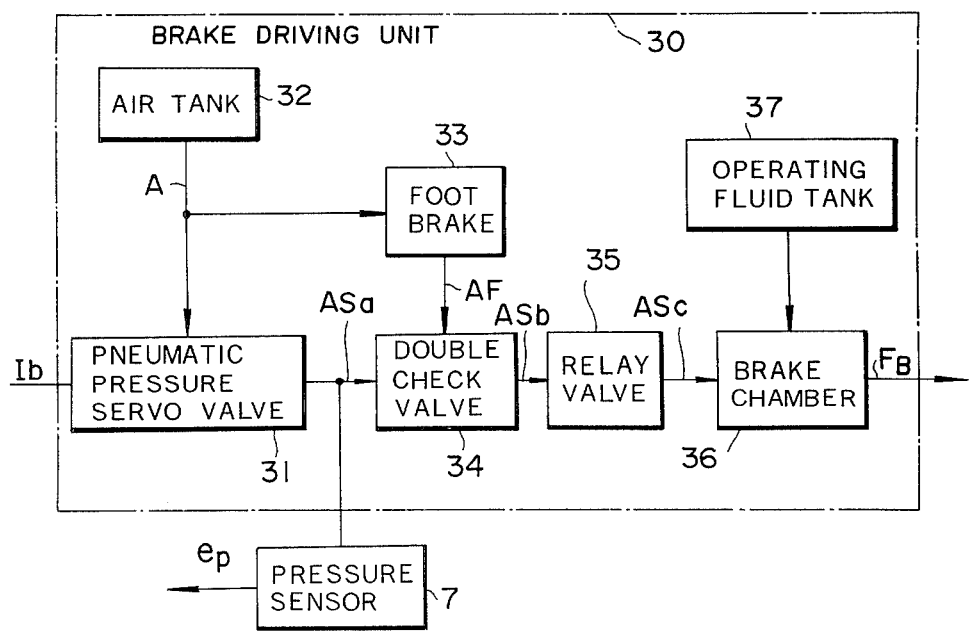
FIG. 13 is a block diagram showing an embodiment of the brake driving system.

The brake control signal outputted from the microcomputer 100 is converted to analog signal eb by the DA converter 18. The pressure sensor 7 detects pneumatic pressure output ASa of a pneumatic pressure servo valve 31 (FIG. 13) of the brake driving unit 30, and outputs corresponding pressure signal ep. The amplifier 19 outputs brake control current Ib corresponding to the difference $\Delta$e between signals eb and ep. The pneumatic pressure servo valve 31 (FIG. 13), which is an electricity-to-pneumatic pressure converter, is controlled according to the brake control current Ib, and outputs pneumatic pressure A supplied from an air tank 32 as pneumatic pressure ASa corresponding to the control current Ib. A foot brake 33 outputs pneumatic pressure A supplied from the air tank 32 as pneumatic pressure corresponding to the brake pedal pressure. A double-check valve 34 outputs pneumatic pressure ASa or AF whichever is greater as pneumatic pressure ASb as they are fed. A relay valve 35 amplifies pneumatic pressure ASb which is fed as pneumatic pressure ASc. A brake chamber 36 is a pneumatic pressure-to-hydraulic pressure converter, and outputs operating fluid supplied from an operating fluid tank 37 as brake pressure FB corresponding to input pneumatic pressure ASc.

Difference $F_0$ (FIG. 1) between this brake pressure FB and disturbance F due to the road slope or load condition is applied to an oil cooled disc brake (wet type multi-disc disc brake) 41 of the rear wheel 40 as an actual braking force.

What is claimed is:

1. A retarder brake automatic control system for causing a vehicle, having an automatic transmission controller for automatically shifting transmission stages corresponding to the speed of the vehicle, to run downhill at a set speed by driving a retarder brake based on a set speed command which is set by speed setting means when the vehicle runs downhill using an engine brake, said system comprising:
   fault detecting means for detecting abnormality in at least one predetermined engine parameter during downhill operation of the vehicle, and
   temporary set speed command generating means for generating a temporary set speed command corresponding to a transmission stage which is one stage lower than the transmission stage of said automatic transmission controller corresponding to the set speed command, causing said retarder brake to be driven based on the temporary set speed command in place of the set speed command at the time of fault detection when an abnormality is detected by said fault detecting means.

2. The retarder brake automatic control system of claim 1, wherein said fault detecting means detects abnormality in the temperature of a brake cooling medium.

3. The retarder brake automatic control system of claim 1, wherein said fault detecting means detects abnormality in engine cooling water temperature.

4. The retarder brake automatic control system of claim 1, wherein said fault detecting means detects abnormality in pneumatic pressure for driving the brake.

5. The retarder brake automatic control system of claim 1, wherein said temporary set speed command generating means comprises:
   a retardation setter for generating temporary set speed command which gradually decreases the present set speed command at the time of the fault detection as the initial value when a fault is detected by said fault detecting means and for stopping the decrease at the time when a transmission stage signal of the automatic transmission controller is changed, and
   a selector for outputting said temporary set speed command in place of said set speed command when a fault is detected by said fault detecting means.

6. The retarder brake automatic control system of claim 1, wherein said temporary set speed command generating means comprises:
   memory means for storing in advance a plurality of temporary set speed values corresponding to the vehicle speed by each transmission stage of automatic transmission controller,
   means for reading out said temporary set speed value corresponding to a transmission stage one stage lower than the transmission stage corresponding to the present set speed command from said memory means when a fault is detected by said fault detecting means, and selector for outputting said temporary set speed command in place of said set speed command when a fault is detected by said fault detecting means.

7. The retarder brake automatic control system of claim 1, wherein said temporary set speed command generating means generates temporary set speed command corresponding to a transmission stage one stage lower than the transmission stage corresponding to said temporary set speed command when fault is continuously detected by said fault detecting means after predetermined period.

8. A retarder brake automatic control system for detecting abnormality of the temperature of a brake cooling medium and controlling downhill speed of a vehicle based thereon, comprising:
 a first temperature sensor for continuously measuring the temperature of the brake cooling medium,
 a second temperature sensor having a first state in response to a normal range of said temperature, and a second state in response to an abnormal range of said temperature,
 judging means for determining the existance of a fault based on the outputs of said first and second temperature sensors, and
 means for stopping said vehicle when a fault is found by said judging means.

9. The control system of claim 8, wherein said first temperature sensor is a thermistor, and said second temperature sensor is a bimetal switch.

10. A retarder brake automatic control system for detecting fault of a speed sensor and controlling the downhill speed of a vehicle based thereon, comprising:
 memory means for storing upper and lower limit values of a vehicle speed for each transmission stage,
 means for reading out the upper and the lower limit values corresponding to transmission stages by transmission speed signals outputted from an automatic transmission controller, and
 a comparing means for issuing a fault signal when a speed value corresponding to the output of the speed sensor becomes out of the range from the upper limit value to the lower limit value of the vehicle speed which has been read out.

11. A retarder brake automatic control system for causing a vehicle, having an automatic transmission controller for automatically shifting transmission stages corresponding to the speed of the vehicle, to run downhill at a set speed by driving a retarder brake based on a set speed command which is set by speed setting means when the vehicle runs downhill using an engine brake comprising:
 temperature range detecting means for detecting into which range between a safety range, a warning range, and an alarm range, the temperature corresponding to the temperature of a brake cooling medium is classified,
 temporary set speed command generating means for generating a temporary set speed command corresponding to a transmission stage which is one stage lower than the transmission stage of said automatic transmission controller corresponding to the set speed command, causing said retarder brake to be driven based on the temporary set speed command in place of set speed command at the time when said temperature is classified into a warning range, and
 slow down stop control means for generating a signal for gradually increasing breaking force in place of the set speed command when said temperature is classified into said alarm range.

* * * * *